United States Patent [19]

Smith

[11] Patent Number: 4,700,513
[45] Date of Patent: Oct. 20, 1987

[54] MOBILE UNIT FOR FACILITATING WOOD FRAME CONSTRUCTION

[76] Inventor: Kenneth W. Smith, 2626 Thorny Dr., Churchville, Md. 21028

[21] Appl. No.: 904,957

[22] Filed: Sep. 8, 1986

[51] Int. Cl.$^4$ .................... E04B 1/343; B25N 1/12; B60P 3/05
[52] U.S. Cl. .................................. 52/69; 52/64; 52/143; 144/285
[58] Field of Search ............... 52/64, 69, 143; 144/285; 296/24 R

[56] References Cited

U.S. PATENT DOCUMENTS

| | | | |
|---|---|---|---|
| 3,283,923 | 11/1966 | Schnyder | 52/64 |
| 3,292,971 | 12/1966 | Zucker | 52/64 X |
| 3,517,962 | 6/1970 | Bassett | 52/64 X |
| 4,055,206 | 10/1977 | Griffin | 144/285 |
| 4,155,204 | 5/1979 | Prozinski | 52/69 |
| 4,469,364 | 9/1984 | Rafi-Zadeh | 296/24 R X |

FOREIGN PATENT DOCUMENTS

409910 3/1945 Italy .................... 296/24 R

Primary Examiner—Alfred C. Perham
Attorney, Agent, or Firm—Shenier & O'Connor

[57] ABSTRACT

A system for facilitating the construction of wood frame panels in which a mobile truck body having tool receiving bays along one side thereof has an enclosure formed on the top thereof for housing a component assembling machine. A normally retracted bridge crane is adapted to move panels from stowed positions on top of the body to operative positions at which they form an upper working area adjacent to the component assembling machine and a lower working area adjacent to the bays. One of the upper panels has an extension and hinged portion adapted to form a material support rack.

15 Claims, 10 Drawing Figures

MOBILE UNIT FOR FACILITATING WOOD FRAME CONSTRUCTION

FIELD OF THE INVENTION

The invention relates to the field of building construction and more particularly, to a mobile unit for facilitating the construction of wood frame wall units.

BACKGROUND OF THE INVENTION

In the building construction industry and more specifically in the home building industry, wood frame wall panels are constructed and erected at the very site which is to be occupied by the home. Where individual homes are being built the wall panels usually are constructed without the use of any special tools or fixtures. Where, however, a large number of units are being built at a particular site or where multiple dwellings are being built, special tools are available for facilitating the construction of wood frame walls. Such special tools, however, require that they be set up on the construction site and that the completed wall panels require considerable man-handling from the location of the special tool to the position on the building subfloor at which they are to be erected. In addition the terrain on which the buildings are to be erected may make the use of such special tools extremely difficult.

SUMMARY OF THE INVENTION

One object of my invention is to provide a mobile unit which facilitates the construction and erection of wood frame wall panels.

Another object of my invention is to provide a system which makes possible the efficient utilization of special framing tools.

A further object of my invention is to provide a system for facilitating the use of special framing tools at the site at which the buildings are to be erected.

Yet another object of my invention is to provide a system which efficiently organizes both the builder's tools and supplies.

Still another object of my invention is to provide a system which appreciably reduces the cost of constructing wood frame panels.

A still further object of my invention is to provide adequate working space which enables the use of special framing tools without occupying an excessive amount of space at the construction site.

Other and further objects of my invention will appear from the following description.

DESCRIPTION OF THE PREFERRED EMBODIMENT

Referring now to the drawings, my mobile unit for facilitating wood frame construction incorporates a beverage truck trailer 10 of a type known in the art which includes a plurality of bays 12 of various sizes, each of which normally is covered by a rollup door 14.

I secure a front support frame 16 made up of sides 18 and 20 and crossbars 22, 24 and 26 to the front of the trailer 10 by any suitable means such as by bolts or the like. The sides 18 and 20 telescopically receive drop legs 28 and 30 which can be lowered to the ground when the unit is in position at the construction site at which it is to be used. The legs can be held in position with relation to the sides 18 and 20 by any suitable means, such for example as by pins 32 or the like. Screw levelers 34 at the bottoms of the legs 28 and 30 permit the unit to be leveled.

Figure 2:
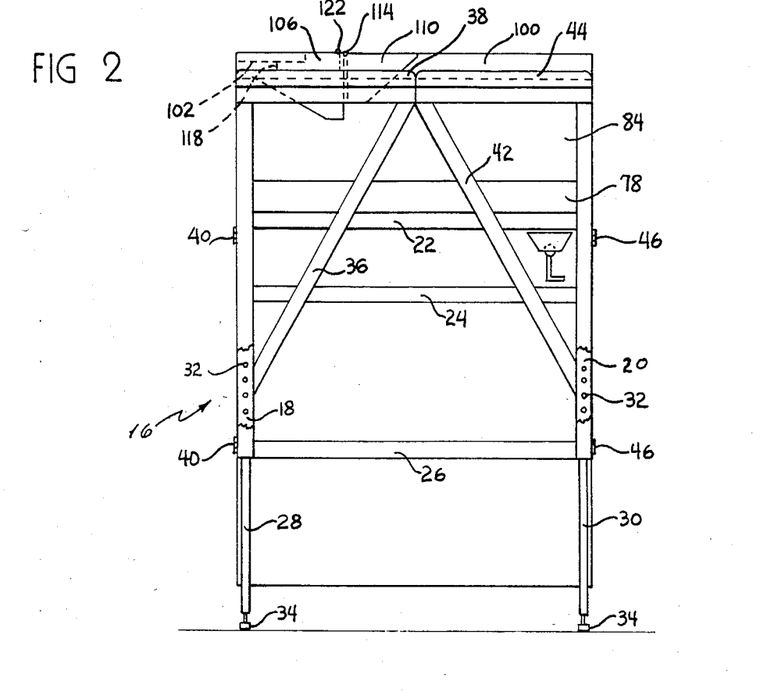
FIG. 2 is a front elevation of the unit shown in FIG. 1.
Figure 4:
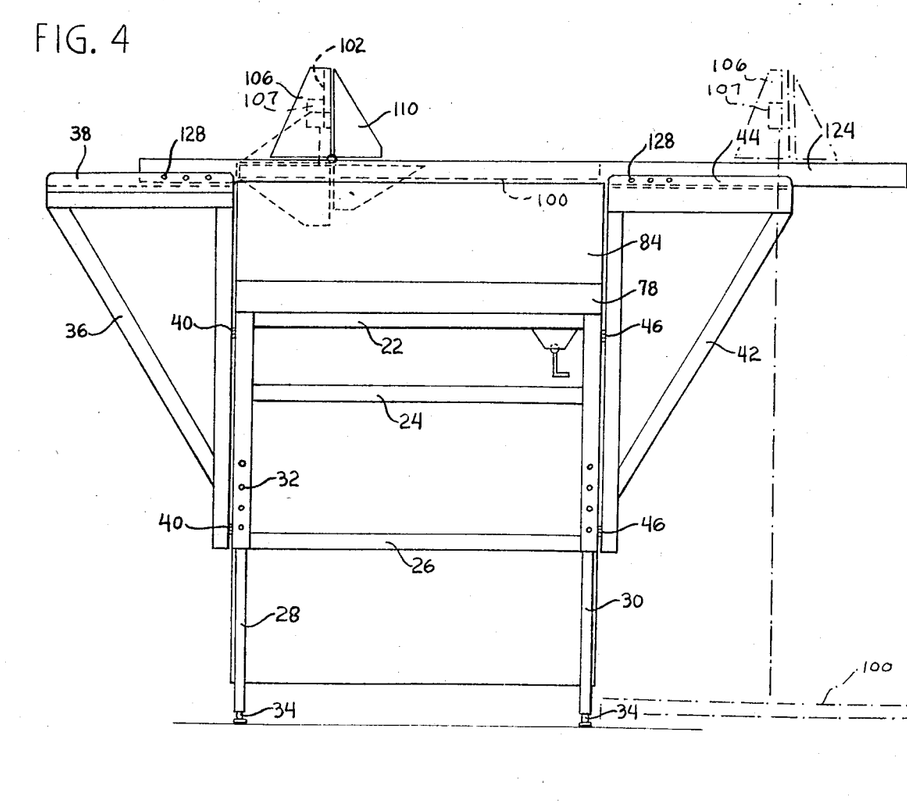
FIG. 4 is a front elevation of the unit shown in FIG. 1 with the panel handling bridge crane erected.
Figure 5:
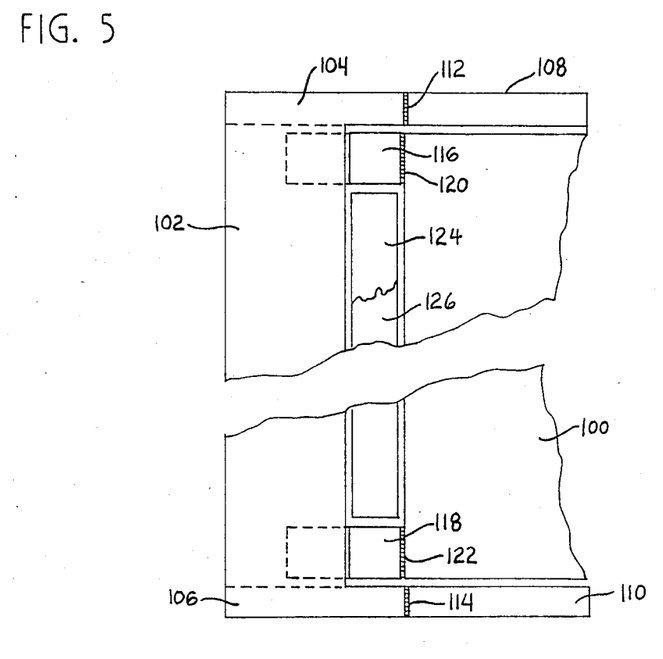
FIG. 5 is a fragmentary top plan of the unit shown in FIG. 1.
Figure 6:
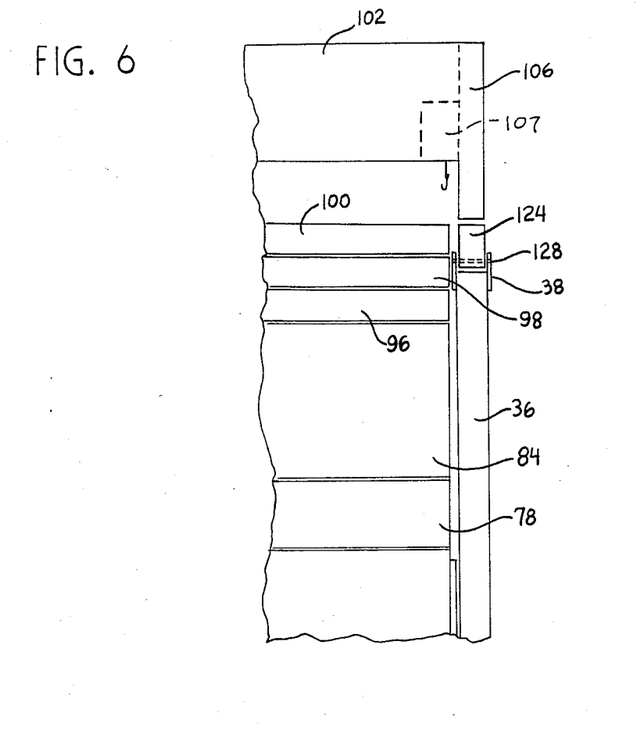
FIG. 6 is a fragmentary side elevation of the unit with the bridge crane erected.

Referring to FIGS. 2 and 4, a generally triangular right front rail bracket 36 carries a horizontally extending channel member 38 on the horizontal leg thereof. I mount the bracket 36 on the side 18 by means of hinges 40 for movement from an inoperative position at which it lies generally flat across the front of the trailer 10 through 180 degrees to an operative position at which it extends outwardly from the right side of the trailer.

A left front rail bracket 42 of generally triangular configuration carries a channel member 44 on its horizontal leg. Hinges 46 support the bracket 42 on the side 20 for movement from an inoperative position across the front of the trailer 10 to an operative position at which it extends outwardly from the left side of the trailer. In the operative positions of the left and right brackets the channels 38 and 44 thereof are aligned to receive a support rail to be described hereinbelow.

Figure 3:
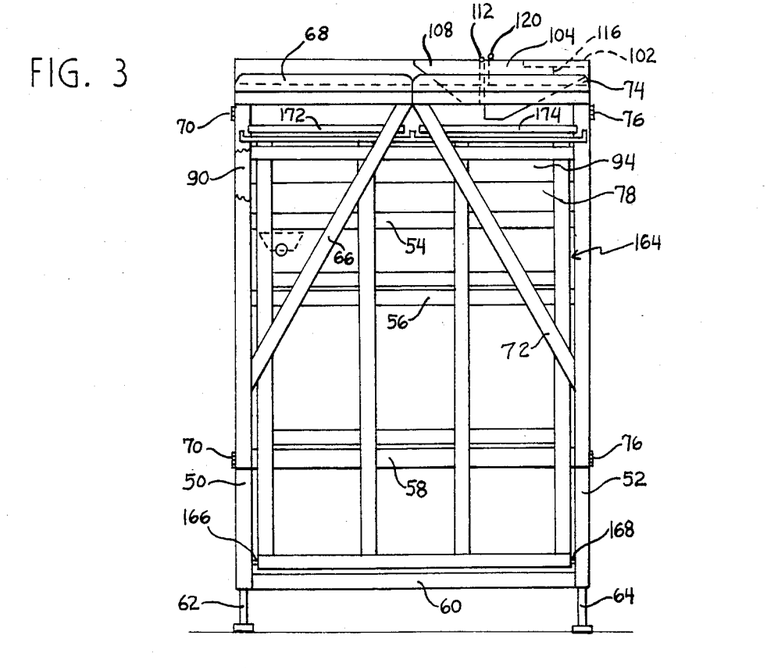
FIG. 3 is a rear elevation of the unit shown in FIG. 1.

Referring to FIG. 3, I secure a rear frame 48 having sides 50 and 52 and crossbars 54, 56, 58 and 60 to the back of the trailer by any suitable means such as bolts or the like. Leveling posts 62 and 64 at the bottoms of the sides 50 and 52 may be manipulated in conjunction with the levelers 34 to level the entire system.

A generally triangular left-hand rear rail bracket 66 has a horizontal leg carrying a channel member 68. Hinges 70 support the left-hand rear rail bracket for pivotal movement on the left-hand frame side 50 between a position at which it lies flat against the back of the trailer 10 to a position at which it extends generally perpendicularly outwardly from the left side of the trailer. A generally triangular rear right-hand rail bracket 72 has a horizontal leg which supports a channel 74. Hinges 76 mount the bracket 72 on the right-hand side 52 of the rear frame for swinging movement through approximately 180° from a position at which the bracket lies flat against the back of the trailer to a position at which it extends generally perpendicularly outwardly from the right-hand side of the trailer 10. In the operative positions of the brackets 66 and 72 their channels 68 and 74 are aligned so as to receive a crane support rail to be described.

Referring to FIGS. 1 to 4, I secure a platform 78 to the top of the trailer 10 by any suitable means, such for example as bolts. Side walls 80 and 82, a front wall 84 and a rear wall 86 extending laterally across the top of the trailer 10 at a point intermediate its ends, normally enclose a space indicated generally by the reference character 88 which houses specialized apparatus for facilitating the formation of wall panels. An example of one type of specialized apparatus is the "Panel Max" made by Senco Fastening Systems of Cincinnati, Ohio. Such an apparatus includes a subcomponent table, a framing table, nailing tools on carriages and a router and the like which facilitates the building of subcomponents, the framing of the wall, panelling frame and the routing out of openings to make the finished product.

Another pair of side walls 90 and 92 which may for example be roller conveyors resting on their edges, extend rearwardly from the wall 86 along the side edges of the trailer to a rear wall 94 to enclose a second storage space.

In the housed or inactive condition of my apparatus respective floor panels 96, 98 and 100 rest on the upper edges of the walls 80, 82, 84, 86, 90, 92 and 94.

Referring to FIGS. 2 to 5, I provide my system with a bridge crane comprising a crosspiece 102 extending transversely of the trailer 10 between a pair of main end pieces 104 and 106 having respective auxiliary end pieces 108 and 110 associated therewith.

Respective hinges 112 and 114 connect the auxiliary end pieces 108 and 110 to the main end pieces 104 and 106. I releasably secure the bridge crosspiece 102 to a pair of arms 116 and 118 connected to the edge of panel 100 by a pair of hinges 120 and 122. In this manner the auxiliary end pieces are mounted for movement between inoperative positions at which they are housed and operative positions in associated relationship with the main end pieces, and the bridge crane as a unit is supported for movement between a housed position at which its main crosspiece 102 extends along one edge of the panel 100 in an erected position. My system includes a pair of bridge crane support rails 124 and 126 adapted to be inserted in the aligned pairs of channels 38 and 44 and 68 and 74, so as to guide the crane 102 for movement transversely of the trailer 10. Pins 128 may be used to position rails 124 and 126 in the channels for movement of the crane outwardly of both sides of the body 10.

Figure 9:
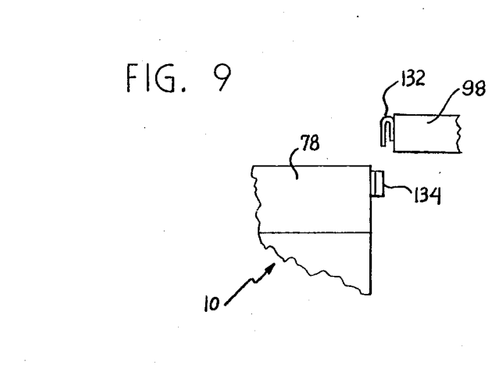
FIG. 9 is a fragmentary view illustrating one form of a means for attaching the panels to the body of the unit.

As will be described more fully hereinbelow, the floor panels 96, 98 and 100 are moved from their stowed positions to operative positions in association with the trailer 10. I provide any suitable means for coupling the panels 96, 98 and 100 in their operative positions to the trailer 10. Referring to FIG. 9, I may for example provide platform 78 with a plurality of spaced receptacles 134 along the edge thereof for receiving a plurality of spaced hooks 132 along the edge of panel 98, for example, to hold the panel 98 in its operative position with relation to the platform 78 on trailer 10.

Figure 7:
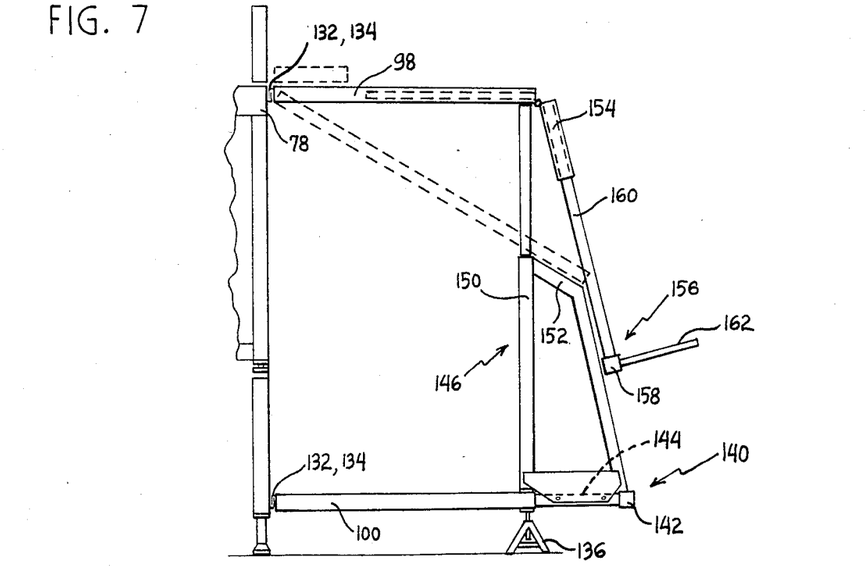
FIG. 7 is a fragmentary end view illustrating the manner of erecting one of the work panels of the unit.
Figure 8:
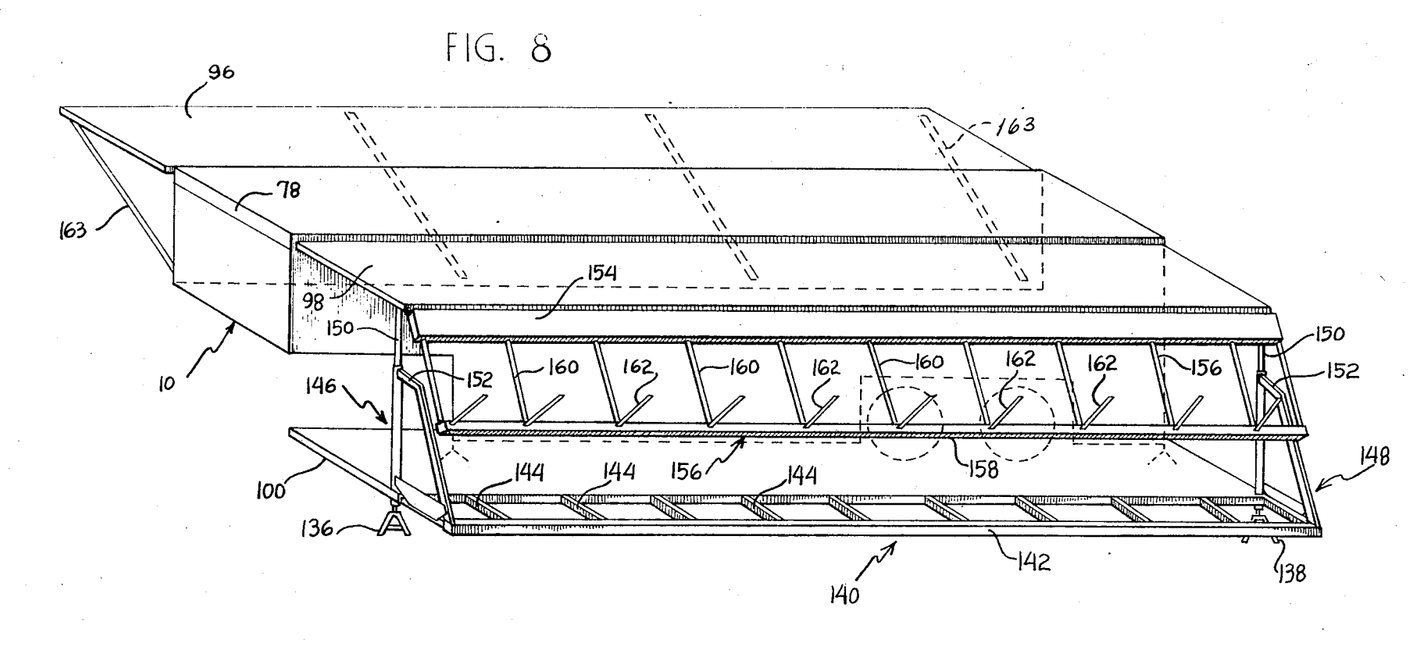
FIG. 8 is a perspective view of the unit with the various panels in position.

Referring now to FIGS. 7 and 8, after the panel 100 has been moved by the bridge crane to an operative position at which an edge thereof is adjacent to the lower edge of the left-hand side of the trailer 10 with its hooks 132 in engagement with receptacles 134 on the trailer, jacks 136 and 138 are placed under the outboard edge of the panel to hold it in a generally level position to provide a work space adjacent to the bays on the left-hand side of the trailer.

I provide the edge of the panel 100 remote from the trailer 10 in the erected position of the panel with an extension indicated generally by the reference character 140 comprising an elongated member 142 supported on a plurality of spaced rods 144 adapted to be telescopically received within the panel 100. In its extended position the extension 140 is adapted to receive two or more bracket assemblies, two of which are indicated generally by the reference characters 146 and 148 at the ends of the extension. Each bracket assembly includes an extendable post 150 and an inclined support portion 152.

After the panel 100 has been moved to its operative position with its extension 140 moved outwardly the bridge crane is employed to move the panel 98 into its operative position in a manner to be described. In that position of the panel 98 the hooks 132 on the inboard edge thereof engage in the receptacles 134 along the edge of the platform 78. The extended posts 150 support the panel at a location just inboard of a hinged portion 154 of the panel 98. In this operative position of the panel 98 an extension indicated generally by the reference character 156 made up of an elongated piece 158 and rods 160 adapted to be telescopically received within the panel 98 is moved to its extended position. In this operative position of the panel the extension thereof rests against the brackets 146 and 148 to permit the downwardly extending portion 154 of the panel and its extension 156 to act as a material support. If necessary, material retainers 162 can be assembled in the longitudinal member 158.

Following the positioning of panels 100 and 98 along the left side of the trailer 10, the bridge crane is operated to position panel 96 along the right edge of platform 78. Hooks 132 along the inboard edge of the panel engage in receptacles 134 along the edge of platform 78. I provide struts 163 extending between the outboard edge of panel 96 and the body of the trailer for holding panel 96 in position.

Figure 10:
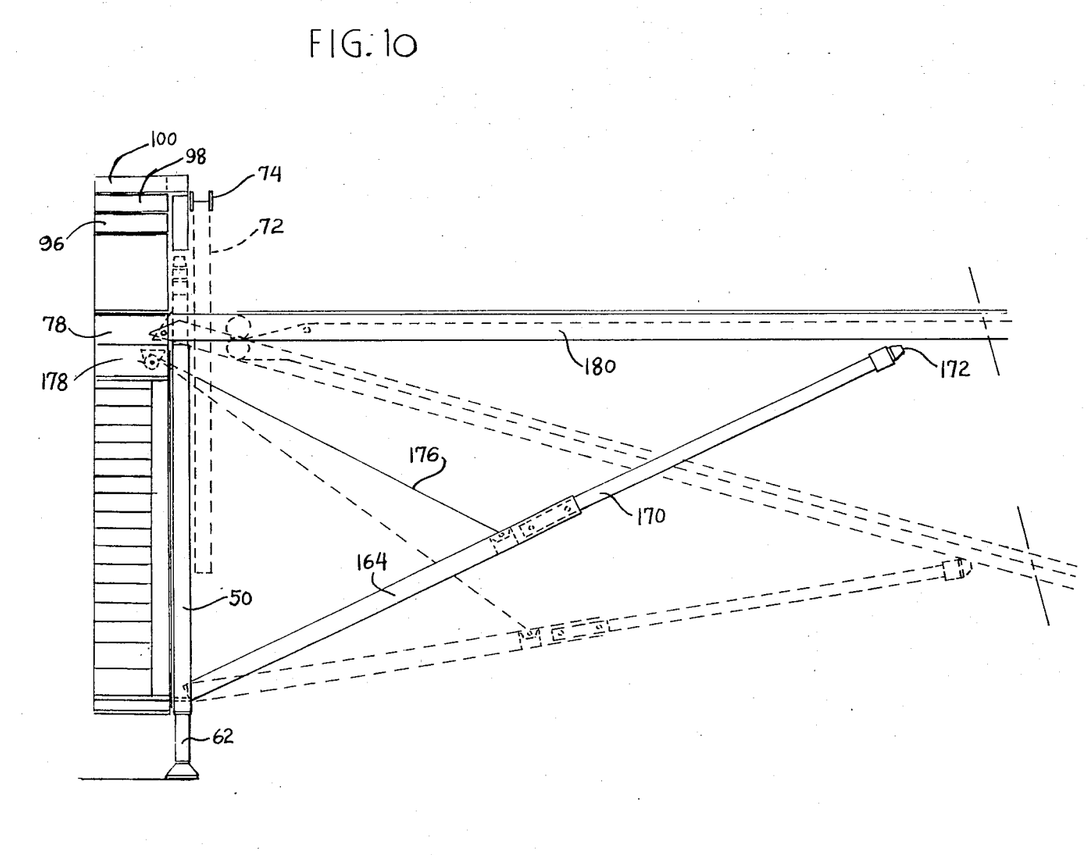
FIG. 10 is a fragmentary view of the right rear portion of the unit.

Referring now to FIGS. 3 and 10, I provide the unit with a rear panel indicated generally by the reference character 164 supported by pivot pins 166 and 168 on the frame members 50 and 52. The panel member 164 includes extensions 170, the outer ends of which carry respective rollers 172 and 174. A cable 176 under the control of a winch 178 is adapted to lower panel 164 from a housed position to a lowered position in which the extensions 170 may be moved outwardly and the panel supported on suitable jacks similar to the jacks 136 and 138.

I construct the platform 78 as a hollow body made up of longitudinally extending I-bars and channels so that the platform can store one or more conveyors 180 for movement from a housed position to an extended position out of the platform. As is illustrated in FIG. 10, the panel 164 and rollers 172 and 174 may be employed to assist in guiding the conveyors 180 into operative positions at which they facilitate the movement of completed panels from the top of the trailer 10 to a location at which or adjacent to which the panels are to be erected. It will readily be appreciated that this arrangement avoids what otherwise would involve considerable manual handling of the completed panels over rough terrain.

Figure 1:
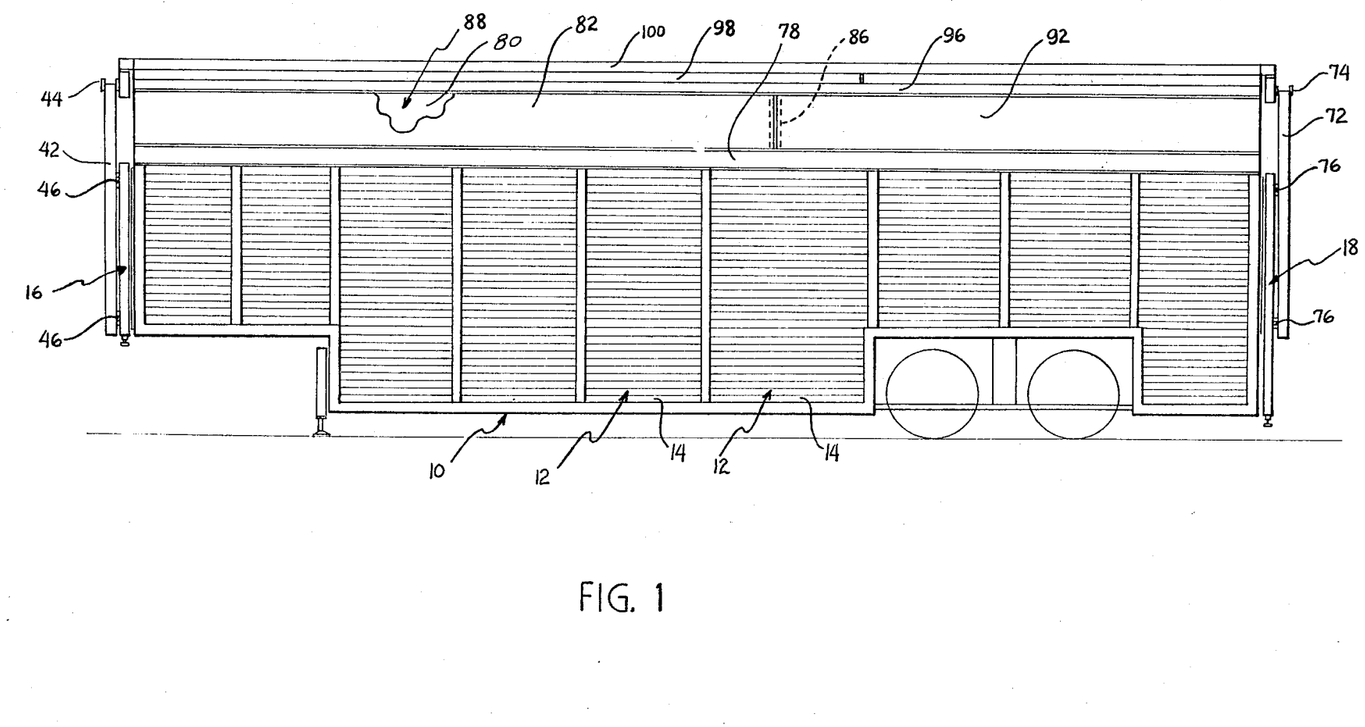
FIG. 1 is a side elevation of my mobile unit for facilitating wood frame construction with all of the parts thereof stowed.

In use of my mobile system for facilitating the construction of wood frame panels, all of the elements of the system normally are stored in the condition illustrated in FIG. 1 until the trailer 10 has been positioned at the site at which the panels are to be constructed. Upon arrival at the site, the legs 28 and 30 are lowered and the trailer is leveled by use of the levelers 34, 62 and 64. Next, the front bridge conveyor support brackets 36 and 42 are swung outwardly to positions at which they extend generally perpendicularly from the sides of the trailer. Next, the rear crane support brackets 66 and 72 are swung outwardly to operative positions at which they extend generally perpendicularly outwardly from the sides of the trailer with the channels 68 and 74 aligned.

The auxiliary bridge crane end pieces 108 and 110 are swung into juxtaposed relationship with the main end pieces 104 and 106 and the crane is then erected. It will readily be appreciated that this can be accomplished by any suitable hand operated cable mechanism or the like. Next, the rails 124 and 126 are positioned in the aligned channels 38 and 44 and 68 and 74, so as to support the bridge crane for movement to the left and right of the trailer.

When the foregoing operations are complete, the various panels may be moved by using the crane. Any suitable means known to the art such as one or more hoisting devices 107 carried by the crane may be employed to detachably secure the panels to the crane for movement to the appropriate positions.

First, the bridge crane is employed to move the panel 100 laterally of the trailer 10 and then to lower the panel 100 into its operative position shown in dot-dash lines in FIG. 4 at which its hooks 132 are engaged in the receptacles 134 along the lower left-hand edge of the trailer 10. As soon as the jacks 136 and 138 are positioned the panel may be detached from the crane and the extension 140 moved outwardly to permit the brackets 146 and 148 to be assembled on the panel 100 by means of bolts or the like.

Next, the panel 98 is attached to the crane and moved laterally outwardly over the panel 100 and lowered until it rests on the inclined supports 152 of the bracket assemblies 146 and 148. When this has been accomplished, the extension 156 is moved outwardly and the rods 150 are extended to permit the hinged portion 154 of the panel 98 to move to the full line position illustrated in FIG. 7 in which the extension 156 rests on the brackets 146 and 148. If necessary, the retainers 162 can be positioned in member 158 to retain material on the rack formed by the extension 156. It will also be appreciated that the extension 140 of the panel 100 provides a material rack for the use of persons working on the panel 100 proper. It will be appreciated that when panel 98 is properly positioned, hooks 132 along its inboard edge engage in receptacles 134 along the left edge of the platform 78.

Panel 96 may now be moved into position by use of the bridge crane by moving it laterally outwardly of the right side of the trailer 10 and supporting it by suitable means, such as struts 163 with hooks 132 along the inboard edge of the panel 96 engaging in receptacles 134 along the right-hand edge of the platform 78.

Finally, the platform 164 can be moved into operative position and may also be used to guide conveyors, such as the conveyors 180, to operative positions.

In addition to the features described in detail hereinabove, it will readily be appreciated that I provide my system with suitable folding ladders and the like to facilitate access to the various platforms. Additional conveyors may be arranged to deliver materials off the side of the trailer as well as from the rear thereof.

In use of my system, once all the operative parts have been erected persons working on the platform 100, for example, have access to various tools such as radial arm saws and table saws and the like normally stowed in the bays 12 of the trailer. Persons working on the deck formed by the panel 96 and 98 have access to the specialty tools, such for example as the "Panel Max" described hereinabove and automatic nailers and the like. Subcomponents made by the persons working on the panel 100 may be placed on the rack formed by the extension 156 for use by persons working on the upper level. The rack formed by extension 156 may provide a material support for other materials used by persons working on the upper level while the rack formed by extension 140 may be used as a support for materials by persons working on the platform provided by panel 100.

It will be seen that I have accomplished the objects of my invention. I have provided a mobile unit which facilitates the construction of wood frame panel. It makes possible the efficient utilization of special framing tools. It facilitates the use of such tools at the site at which buildings are to be erected. It efficiently organizes both the builder's tools and his supplies. It appreciably reduces the cost of constructing wood frame panels. It does not occupy an excessive amount of space at the construction site for the results achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A mobile system for facilitating the construction of wood frame panels including in combination, a mobile truck body formed with a plurality of tool storage bays along a side thereof, means on the top of said body normally forming an enclosure for a panel-forming apparatus, a first panel adapted to occupy a stowed position on top of said enclosure forming means, a second panel adapted to occupy a stowed position on top of said first panel, crane means on said body for sequentially moving said second panel to an operative position at which an inner edge thereof is adjacent to a lower side edge of said body with said second panel substantially horizontal and moving said first panel to an operative position at which an inner edge thereof is adjacent to the upper side edge of said body and means for retaining said first and second panels in said operative positions to provide an upper working area adjacent to a panel-forming apparatus in said enclosure and a lower working area adjacent to said bays.

2. Apparatus as in claim 1 in which said means for retaining said second panel in operative position comprises jacks for supporting the outer edge of the second panel and means for securing the inner edge of the second panel to the lower side edge of said body.

3. Apparatus as in claim 1 in which said means for retaining said first panel comprises extensible posts carried by the second panel for engaging the outer edge of the first panel and means for securing the inner edge of the first panel to the upper side edge of the body.

4. Apparatus as in claim 3 in which said means for retaining said second panel in operative position comprises jacks for supporting the outer edge of the second panel and means for securing the inner edge of the second panel to the lower side edge of said body.

5. Apparatus as in claim 1 in which said first panel comprises an extension adapted to be moved outwardly from said outer edge and a hinged portion adapted to swing downwardly when said extension has been moved outwardly to provide a material rack formed by said extension and said hinged portion.

6. Apparatus as in claim 5 including means for supporting said first panel in a downwardly inclined position relative to the top of said body prior to outward movement of said extension.

7. Apparatus as in claim 6 in which said supporting means comprises a bracket carried by said second panel, said bracket having a first leg for supporting said first panel in said inclined position and a second leg for supporting said material rack.

8. Apparatus as in claim 1 including a third panel adapted to be stowed on top of said enclosure forming means, said crane adapted to move said third panel to an operative position at which an inner edge thereof is adjacent to the other upper side edge of said body with said third panel substantially horizontal and means for holding said third panel in said operative position to provide a second upper working area.

9. Apparatus as in claim 1 including a hollow platform on top of said body, elongated conveyors stored in said platform, a back panel hingedly secured to the lower back edge of said body, extensions on said back panel, means for lowering said back panel into position and means on said extensions for guiding said conveyors into operative positions.

10. A mobile system for facilitating on the site construction of building wall components including in combination, a vehicle body, a work area forming panel normally occupying a stored position on said vehicle body, said panel adapted to occupy an operative position in contiguous relationship to said vehicle body adjacent to the bottom thereof, a bridge crane, means mounting said bridge crane on said body for movement between a retracted position and a position at which it can receive said panel, and means for guiding said crane for movement to a position outboard of said vehicle body to move said panel to said operative position, said guide means being carried by said vehicle body in normally inoperative condition and adapted to be rendered operative at said site.

11. A system as in claim 10 in which said guide means comprises a pair of guide brackets and means mounting said brackets for movement between retracted positions and operative positions in which they extend outwardly in generally parallel spaced relationship from said body.

12. A system as in claim 11 in which said brackets are mounted on said body for swinging movement between said retracted positions and said operative positions.

13. A system as in claim 12 in which said brackets are formed with channels and in which said guide means comprises bars adapted to be received in said channels to support said crane in the operative position thereof.

14. A system as in claim 11 in which said guide means comprises a second pair of brackets extending in their operative positions in a direction opposite to that in which the first brackets extend.

15. Apparatus as in claim 10 in which said crane comprises a pair of main end pieces, a cross member extending between said end pieces, a pair of auxiliary end pieces, means mounting said auxiliary end pieces on said main end pieces for movement between retracted positions and positions in operative relationship with said main end pieces and means mounting said main end pieces on said body for swinging movement between retracted positions and erected positions.

* * * * *